(12) United States Patent
Bayley et al.

(10) Patent No.: US 8,391,503 B2
(45) Date of Patent: Mar. 5, 2013

(54) WIRELESS HEADSET NOISE EXPOSURE DOSIMETER

(75) Inventors: Antony Bayley, Wootton Bassett (GB); Kwangsee Woo, Scotts Valley, CA (US); Steven Wong, Swindon (GB)

(73) Assignee: Plantronics, Inc., Santa Cruz, CA (US)

( * ) Notice: Subject to any disclaimer, the term of this patent is extended or adjusted under 35 U.S.C. 154(b) by 1083 days.

(21) Appl. No.: 12/196,480

(22) Filed: Aug. 22, 2008

(65) Prior Publication Data
US 2010/0046767 A1 Feb. 25, 2010

(51) Int. Cl.
*H04R 29/00* (2006.01)
(52) U.S. Cl. ........... 381/59; 381/56; 381/309; 381/71.1; 381/72; 381/60; 381/320; 381/328
(58) Field of Classification Search .................... 257/59, 257/56, 309, 71.1, 72, 60, 320.328; 381/59, 381/56, 309, 71.1, 72, 60, 320.328
See application file for complete search history.

(56) References Cited

U.S. PATENT DOCUMENTS

| | | | |
|---|---|---|---|
| 6,507,650 B1 * | 1/2003 | Moquin | 379/387.01 |
| 6,826,515 B2 * | 11/2004 | Bernardi et al. | 702/191 |
| 7,817,803 B2 * | 10/2010 | Goldstein | 381/56 |
| 2003/0191609 A1 * | 10/2003 | Bernardi et al. | 702/191 |
| 2008/0146892 A1 * | 6/2008 | LeBoeuf et al. | 600/300 |
| 2009/0034765 A1 * | 2/2009 | Boillot et al. | 381/309 |

FOREIGN PATENT DOCUMENTS

| | | |
|---|---|---|
| GB | 2349466 A | 11/2000 |
| WO | 03067202 A2 | 8/2003 |
| WO | 2007150033 A2 | 12/2007 |
| WO | 2008095167 A2 | 8/2008 |

OTHER PUBLICATIONS

Plantronics, Inc. DA Series Professional Corded USB-to-Headset. Data sheet. Copyright Apr. 2008.
Plantronics, Inc. Plantronics Augments Family of VOIP-Optimized Headset Solutions. Press Release. Oct. 26, 2006.
Plantronics, Inc. PerSono Pro 2.3.1.2 Agent Help Guide. Released Jan. 16, 2004.
GN Netcom, Inc.. Jabra GN9350. Data sheet. Copyright 2007.
GN Netcom, Inc.. Jabra GN8210. Data sheet. Copyright 2008.
Acoustic & Vibration Instruments Ltd. Headset Measurement System Overview. Copyright 2007.
Altesys. Eustachio Sound Management Unit for Call Centre Headsets. Brochure. Sep. 3, 2006.
Polaris. Soundshield 3G. Brochure. Nov. 10th, Copyright 2006.
EPO. International Search Report & Written Opinion. PCT/US2009/054645. Mail Date: Dec. 30, 2009.

* cited by examiner

*Primary Examiner* — A O Williams
(74) *Attorney, Agent, or Firm* — Chuang Intellectual Property Law

(57) ABSTRACT

Systems and methods for measuring noise exposure associated with use of a wireless headset are presented. In one example, a transition from a wireless headset standby mode operation to a wireless headset active mode operation is identified. A stored noise dose measurement at the wireless headset is recalled, and a current noise dose measurement is calculated at the wireless headset for a duration of the active mode operation. A transition from the wireless headset active mode operation to the wireless headset standby mode operation is identified, and an updated noise dose measurement is recorded at the wireless headset.

20 Claims, 11 Drawing Sheets

20

| WORD | NAME |
|---|---|
| 1 | Noise Dose Measurement |
| 2 to 5 | Start Time |
| 6 | Criterion Sound Level |
| 7 | Exchange Rate |
| 8 | Threshold Sound Level |
| 9 ... 40 | Headset modeling filter |

FIG. 4

WIRELESS HEADSET NOISE EXPOSURE DOSIMETER

BACKGROUND OF THE INVENTION

In a work environment, the accumulated amount of noise, or dose in terms of an average noise level, and the maximum level of noise to which an individual has been exposed during a workday are important to occupational safety and to the health of the individual. Industry and governmental agencies in countries throughout the world, such as the Occupational Safety and Health Administration (OSHA) in the United States, require accurate noise data measurements.

Examples of such noise data measurements include impulse noise, continuous noise, and an eight-hour time-weighted average ("TWA") that is also referred to as "daily personal noise exposure". Impulse noise relates to noise of very short duration. Continuous noise relates to noise that is longer in duration than impact noise, extending longer than 500 milliseconds. Eight-hour TWA relates to the average of all levels of impulse and continuous noise to which an employee is exposed during an eight-hour workday. The OSHA maximum level for impulse noise is 140 dBSPL measured with a fast peak-hold sound level meter ("dBSPL" stands for sound pressure level, or a magnitude of pressure disturbance in air, measured in decibels, a logarithmic scale). The maximum level for continuous noise is 115 dB(A) (read on the slow average "A" scale). OSHA regulations limit an eight-hour TWA to 90 dB(A). If employees are exposed to eight-hour TWAs between 85 and 90 dB(A), OSHA requires employers to initiate a hearing conservation program which includes annual hearing tests.

Among the many noise sources that are encountered in the workplace, measuring the exposure to noise related to telephone headsets is especially problematic. Standard noise exposure measurement procedures described in the United States Code of Federal Regulations at 29 CFR 1910.95 and International Organization for Standardization (ISO) 1999 can only be performed for open-field environmental noise that can be measured with a sound level meter. An "open-field" environment is an environment where the sound or noise sources are at a distance from a person's ear. The sound or noise environment can be a single or a combination of many acoustic fields, i.e. free field, partially reflected field, diffuse field and reverberant field. Noise exposure from headsets is different from the "open-field". The sound is localized at or inside of the users' ear. It is necessary to transfer the measured earphone or headset sound pressure levels to the "open-field" before comparing them to the regulatory TWA noise exposure limits.

In the prior art, the most accurate noise exposure measurement technique for headsets, and other equipment that uses sound-sources placed close to the ear, is the MIRE (Microphone in Real Ear) technique as defined in ISO 11904-01. However fitting a calibrated microphone in the ear is uncomfortable and obtrusive, and the measurement equipment is bulky and needs a skilled operator. Therefore the MIRE technique is unsuitable for measuring the noise exposure of a mobile user, without seriously affecting his mobility and normal working practices.

Another prior art method for noise exposure measurement in a corded headset utilizes a buffered splitter in the headset cable to drive a second headset with the same signal as the user's headset. The second headset is placed on a head and torso simulator (HATS) in order to make calibrated sound level measurements. This method avoids the difficulty and discomfort of fitting an in-ear microphone. However, it is unsuitable for a mobile user wearing a wireless headset because a wireless headset has no headset cable in which to insert a splitter, and the measurement equipment (HATS and sound level meter/dosimeter) is not portable, so it can only be used to measure noise exposure for static users such as call-centre agents. Measurements cannot be made for mobile headset users without significantly altering their headset usage patterns. Furthermore, this method is not suitable for headsets that have built-in, user adjustable, receive-volume controls, as it is difficult to ensure that the volume controls for both the user's headset and the test headset are set identically.

Another prior art method for measuring noise exposure in corded headsets is based on the alternative daily noise exposure measurement method described in ITU Telecommunication Standardization Sector (ITU-T) Recommendation P.360 and European Telecommunications Standardization Institute (ETSI) EG 202 518. This alternative noise exposure measurement method does not require the expensive and bulky test equipment that the standard HATS measurement technique uses at the test site. Its principle of operation is (1) electrical monitoring of the signal at the input of the headset's speaker (i.e., after all volume controls), (2) estimation of the acoustic pressure at the eardrum by means of a statistically validated model of the headset response, as characterized on the HATS in the laboratory, and (3) calculation of the equivalent sound pressure level of the received speech in the diffuse field, according to ISO 11904.

The accuracy of this alternative measurement method depends primarily on the accuracy of the model used for acoustic pressure estimation at the eardrum. Using a generic model of the speaker/ear transfer function for a particular headset type typically results in daily personal noise exposure measurements within a few decibels (dB) of the "true" value. The measurement error is caused by variations between the sensitivity or frequency response of the generic model and the specific headset that is in use. These variations exist due to normal manufacturing tolerances. However if the model of the headset response is based on an individual HATS measurement for the specific headset, then the alternative measurement method is as accurate as the standard HATS headset noise exposure measurement method. In fact it may be slightly more accurate, because the measurement uses the characteristics of the actual headset that is in use, rather than using a splitter cable and a second headset that is similar to it, but not identical. U.S. Pat. No. 6,826,515 entitled "Headset Noise Exposure Dosimeter" and assigned to Plantronics, Inc., describes a noise dosimeter integrated with a corded headset.

In most countries outside the United States, the standard daily personal noise exposure calculation method, defined in ISO 1999, starts by calculating the equivalent continuous A-weighted sound pressure level $L_{Aeq,Te}$. The calculation continuously integrates sound pressure level with respect to time, divides by the duration of the working day, and then scales the result to account for differences between the actual time worked and the 8-hour "reference" duration, as shown in equations (1) and (2).

$$L_{Acq,Te} = 10\log_{10}\left|\frac{1}{t_2-t_1}\int_{t_1}^{t_2}\frac{(p_A(t))^2}{p_0^2}dt\right| \quad (1)$$

$$L_{EX,8h} = L_{Aeq,Te} + 10\log_{10}\left|\frac{T_e}{T_0}\right| \quad (2)$$

where:

$L_{Aeq,Te}$=equivalent continuous A-weighted sound pressure level $p_A(t)$=A-weighted sound pressure level, in Pascals, as a function of time $p_0$=reference pressure (=20 μPa)

$L_{EX,8h}$=Daily personal noise exposure $T_e$=effective duration of the working day (normally $T_e=t_2-t_1$)

$T_0$=reference duration (=28800 seconds, equivalent to 8 hours)

In the United States, a different measurement method is used set forth in 29 CFR 1910.95, in which only sound levels above 80 dB(A) contribute to daily personal noise exposure. Also, the measurement method uses a 5 dB exchange rate instead of a 3 dB exchange rate, where doubling the duration of noise exposure corresponds to a 5 dB increase in daily personal noise exposure instead of a 3 dB increase. The time-weighted averaging process of equations (1) and (2) inherently has a 3 dB exchange rate, so cannot be used for USA daily personal noise exposure measurements. An alternative measurement procedure is used, based on the American National Standards Institute (ANSI) S1.25 noise dose calculations.

Direct calculation of daily personal noise exposure using equations (1) and (2) has a disadvantage: It requires accurate measurement of elapsed time ($t_2$, $t_1$, $T_e$), and thus requires a "real time" clock. In equation (1), t1 and t2 are the times at which the measurement starts and stops, and the expression (t2−t1) is the length of the working day. A "real-time" clock is an electronic hardware or software module from which a microprocessor or DSP can read the time and date. It maintains its time-keeping accuracy regardless of whether the host device in which it is embedded is switched on or off. This is normally achieved by using a battery or super-capacitor to provide back-up power to the real-time clock module when the host device is powered down. Some common examples of real-time clocks are the system clock in a PC and the recording timer in a video recorder.

Wireless headsets do not normally contain a real-time clock module, but they invariably contain a very stable crystal-controlled frequency reference that is used by their microprocessor and DSP. Thus, as long as the headset is switched on, it can accurately measure the duration of events, or schedule actions to occur at precisely defined intervals. However when switched off, all timing information is lost. When the headset is switched on again, the time period for which the headset has been off is unknown. Therefore if a headset is switched off and on again between the times that an event starts and ends, the duration of that event cannot be measured. Adding a discrete real-time clock module to a wireless headset significantly increases both the component cost and the headset size, so is not a preferred option. Thus, the direct calculation of daily personal noise exposure using equations (1) and (2) described above cannot be evaluated on a wireless headset.

As a result, there is a need for improved methods and apparatuses for measuring noise exposure in wireless headsets.

BRIEF DESCRIPTION OF THE DRAWINGS

The present invention will be readily understood by the following detailed description in conjunction with the accompanying drawings, wherein like reference numerals designate like structural elements.

FIG. 4 illustrates the content stored in the non-volatile memory of the wireless headset shown in FIG. 2 in one particular example.

DESCRIPTION OF SPECIFIC EMBODIMENTS

Figure 1:
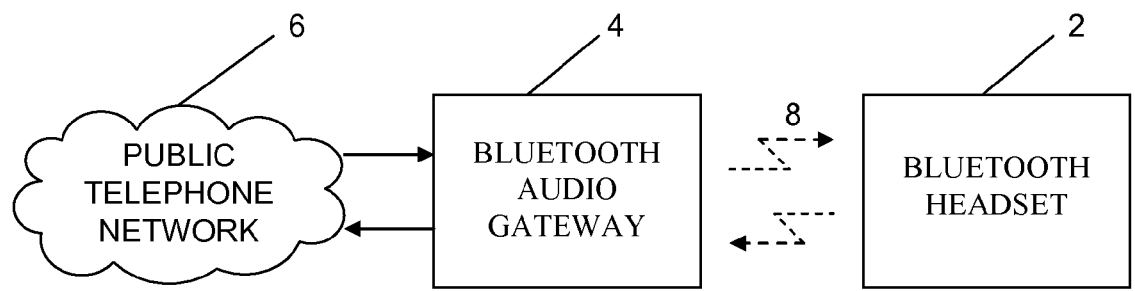
FIG. 1 illustrates a wireless headset in use in a communications system.

Methods and apparatuses for measuring noise exposure in wireless headsets are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to the general field of acoustic measurements and more specifically, to noise exposure measurements for headsets. In one example, the daily personal noise exposure of a wireless headset user is measured without affecting the normal headset usage pattern. Noise dose calculations are performed instead of a conventional equivalent continuous A-weighted sound pressure level calculation. Noise dose calculations are conceptually easier to understand, since the continuously updated measurement result stored in the headset has a clear meaning: it is the current daily personal noise exposure expressed as a percentage of the allowable maximum daily limit. For instance, a 100% dose is equivalent to 90 dB(A) daily noise exposure, and a 50% dose is equivalent to 85 dB(A) daily noise exposure for the USA measurement standard. Calculating noise dose values, instead of directly calculating the daily personal noise exposure value, does not require a real-time clock. Using this measurement technique, noise exposure can be calculated despite discontinuous operation of the headset, and the technique is compatible with the existing hardware platforms of many wireless headsets.

The noise dose calculations are performed within the headset. The noise dose calculation is similar to ANSI S1.25, but can be configured to conform to either USA or other international measurement standards. The noise dose calculations are based on measurements of the equivalent open-field A-weighted sound pressure level (SPL).

Headset usage is unaffected by the noise exposure measurement, and any changes to the headset's volume control are taken into account. The measurement system is configured, and the noise dose and/or noise exposure value read, via a PC, either using wireless data communications or a corded connection. In another example of the invention, the measurement system is configured and the noise dose is read via a user-interface built into the headset. In this example, the start-time is not recorded because the headset, unlike the PC does not have a real-time clock. The user is responsible for remembering when he started and stopped the measurement, and to interpret the noise dose result accordingly.

In one example of the invention, a method for measuring noise dose on a wireless headset includes identifying a first transition from a wireless headset standby mode operation to a wireless headset active mode operation, recalling a stored noise dose measurement at the wireless headset, and calculating a current noise dose measurement at the wireless headset for a duration of the active mode operation. The method further includes identifying a second transition from the wireless headset active mode operation to the wireless headset standby mode operation, and recording an updated noise dose measurement at the wireless headset.

In one example, a wireless headset for measuring noise dose includes a wireless communications transceiver, a speaker for outputting an audio signal into a user ear, and a non-volatile memory storing a filter modeling a frequency response associated with a headset receiving signal path, a criterion sound level, an exchange rate, a threshold sound level, a start time, and a recorded noise dose measurement. The wireless headset further includes a processor, where the processor calculates a noise dose responsive to establishment and termination of an active wireless communications link by the wireless communications transceiver.

In one example, a computer readable storage medium storing instructions that when executed by a computer cause the computer to perform a method for measuring noise dose on a wireless headset. The method includes identifying a first transition from a wireless headset standby mode operation to a wireless headset active mode operation, recalling a stored noise dose measurement at the wireless headset, and calculating a current noise dose measurement at the wireless headset for a duration of the active mode operation. The method further includes identifying a second transition from the wireless headset active mode operation to the wireless headset standby mode operation, and recording an updated noise dose measurement at the wireless headset.

FIG. 1 illustrates a wireless headset in use in a communications system. In the example illustrated in FIG. 1, the wireless headset is a Bluetooth (BT) wireless headset 2 connected to a Bluetooth audio gateway (AG) 4 via a bidirectional radio channel 8 that implements the Bluetooth protocol, which provides audio and data transport. Typically the Bluetooth AG 4 is part of a mobile telephone, a corded telephone interface or a computer interface, such that calls on the public telephone network 6 or a voice-over IP telephone network may be made or answered using the Bluetooth wireless headset 2.

Although examples are described herein in reference to a wireless Bluetooth headset, the methods and systems described herein can also be applied to measure the noise exposure caused by any audio device that uses sound-sources placed close to the ear, so long as the audio device has a processor capable of implementing the noise dose calculations. Such devices include, for example, wireless headsets or telephones using other transmission protocols besides Bluetooth (DECT, GSM, IEEE 802.11, etc), corded headsets and telephones, and media players.

Figure 2:
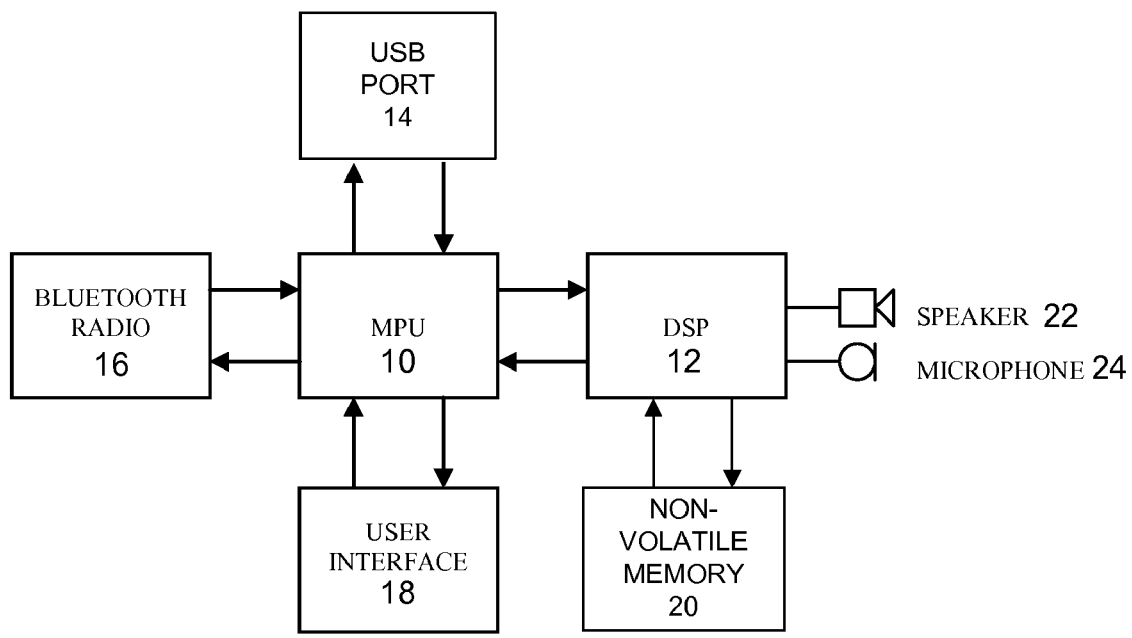
FIG. 2 illustrates a simplified block diagram of one example configuration of a wireless headset for measuring noise dose.

FIG. 2 illustrates a simplified block diagram of one example configuration of the Bluetooth wireless headset 2 for measuring (also referred to herein as calculating) noise dose. The Bluetooth wireless headset 2 includes a BT radio transceiver 16, microprocessor unit (MPU) 10, digital signal processor (DSP) 12, user interface 18, non-volatile memory 20, a receiver in the form of speaker 22 for outputting an audio signal into a user ear, and a microphone 24. Microprocessor unit 10 implements some or all of the Bluetooth protocol stack, performs system control, and transfers audio data between the Bluetooth radio transceiver 16 and digital signal processor 12. In a further example, BT wireless headset 2 does not utilize a separate DSP 12, and functions described herein performed by DSP 12 are performed by MPU 10. In this example, MPU 10 includes a USB interface port 14 that can be used for data transfer, headset configuration, software updates and headset battery charging. The DSP 12 performs audio signal processing on the audio streams flowing between the headset's speaker 22 and microphone 24 and the Bluetooth radio transceiver 16. The DSP 12 also implements the noise exposure dosimeter calculations described herein.

Non-volatile memory 20 stores a filter modeling a frequency response associated with the speaker 22, a criterion sound level, an exchange rate, a threshold sound level, a start time, and a recorded noise dose measurement. The DSP 12 calculates a noise dose responsive to establishment and termination of an active wireless communications link by the wireless communications transceiver. The recorded noise dose measurement is an accumulation of calculated noise doses responsive to establishment and termination of a plurality of active wireless communication links. In the example shown in FIG. 2, the wireless communications transceiver is the Bluetooth radio transceiver 16 and the active wireless communications link is a Bluetooth audio SCO channel. The BT wireless headset 2 may also include a noise exposure limiter for modifying a gain of the audio signal responsive to a long-term rms SPL exceeding the criterion sound level, or other chosen threshold sound level. The BT wireless headset 2 may also provide a user interface warning option such as an earcon or LED light as well as, or instead of, modifying the gain when a long-term rms SPL exceeds the criterion sound level.

Figure 3:
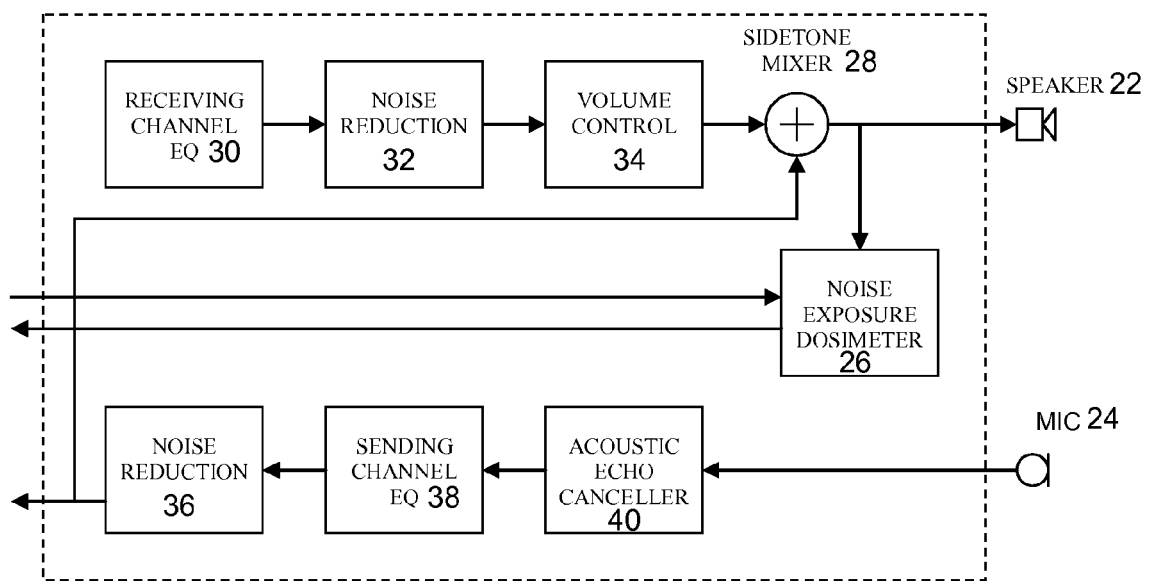
FIG. 3 illustrates audio signal processing performed by the DSP in the wireless headset shown in FIG. 2 in one example.

FIG. 3 illustrates audio signal processing by DSP 12 in the wireless headset shown in FIG. 2 in one example. The DSP 12 implements all required audio signal processing in software. DSP 12 calculates noise dose and noise exposure using noise exposure dosimeter 26 as described herein in reference to FIGS. 6-8. Sending-channel processing is applied to the headset-wearer's speech that is captured by the microphone 24. The sending-channel processing typically includes an acoustic echo canceller 40 to prevent the far-end talker's speech from feeding back from the speaker 22 to the microphone 24, and some equalization (tone control) 38 and noise reduction 36. Advanced noise reduction algorithms may use more than one microphone.

Receiving-channel processing is applied to the speech or other audio that the headset-wearer hears via speaker 22. Receiving-channel processing typically includes equalization (tone control) 30, noise reduction 32 and some combination of automatic and manual volume controls 34. A proportion of the sending-channel audio is mixed into the receiving-channel as sidetone using sidetone mixer 28. Sidetone compensates for the fact that the headset partially blocks the ear, which, in the absence of sidetone, leads to unnaturally loud sending-channel speech level. Headsets may include more than one speaker (e.g. for stereo music playback). The noise exposure dosimeter 26 monitors the receiving-channel speech level at the output of sidetone mixer 28, after all audio signal processing and volume control has been applied.

Figure 5:
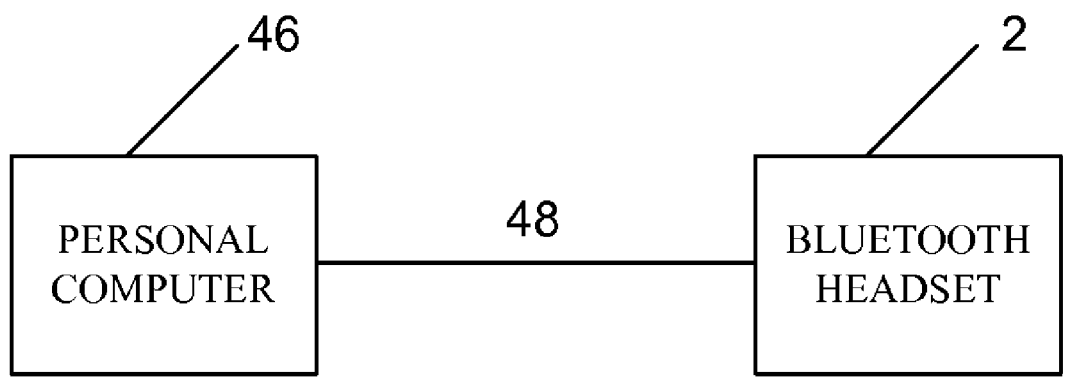
FIG. 5 illustrates reporting of noise exposure data from a wireless headset to a personal computer.

FIG. 5 illustrates reporting of noise exposure data from a wireless headset 2 to a personal computer (PC) 46. In one example, the noise exposure dosimeter 26 is configured and read via an interface to the headset MPU 10, which controls data transfer between the wireless headset 2 and the PC 46. PC 46 provides the noise exposure dosimeter's user interface. The wireless headset 2 to PC 46 connection may be via a Bluetooth or other wireless link or a corded connection (e.g. micro-USB or USB) 48.

FIG. 4 illustrates the content stored in the memory of the wireless headset shown in FIG. 2 in one particular example. In this example, DSP 12 is an CSR plc Kalimba digital signal processor included on a CSR BC5MM integrated circuit. However, any DSP having sufficient power to implement the acoustic pressure and noise exposure calculations in real-time memory, and having non-volatile memory to store data while the headset is switched off may be used.

The BC5MM integrated circuit contains a number of PS-keys ("Permanent Storage") for non-volatile storage of configuration parameters that can be read or written by program code running on the Kalimba DSP, which is the part of the BC5MM that performs the acoustic pressure and noise dosimetry calculations. In this example, a PS-key is used to store the headset frequency response data, and also used as a mechanism for reading the noise dose from the headset and configuring the dosimeter. For research involving a small number of headsets, a skilled operator can manually read and write the PS-keys using CSR's standard "PStool" software. If noise dosimetry is included in standard headsets, a custom PC application can be written to manage the noise exposure measurements. For the latter scenario a generic receiving sensitivity frequency response can be programmed into all headsets, providing lower measurement accuracy than individual calibration, but avoiding the considerable extra cost of the calibration process.

Each PS-key can store up to 64 16-bit words. 32 words is sufficient to store the coefficients of a finite impulse response (FIR) filter that replicates the frequency response of a headset to an accuracy of ±1 dB for frequencies within the telephone band (300 Hz to 3.4 kHz), at a sampling rate of 8 kHz. In one example, a single PS-key is used for all the TWA noise exposure measurement parameters. This PS-key contains the headset modeling filter coefficients, dosimeter configuration parameters, start-time and noise dose measurement. Systems that do not use the BC5MM integrated circuit may not contain the same PS-key structure. For these systems the same data is stored in the non-volatile memory provided by their hardware platform.

Referring again to FIG. 4, the non-volatile memory 20 stores a plurality of words 42 having names 44 in a single PS-key. Word 1 stores the value of the noise dose measurement. The noise dose measurement is the daily personal noise exposure expressed as a percentage of the criterion sound level. Words 2 to 5 store the start time. The start time is the time the current noise exposure measurement period was started. In one example, the start time is in a Microsoft 64-bit DateTime format. Word 6 stores the criterion sound level, which is the maximum allowable daily personal noise exposure. As described further herein, the criterion sound level used in noise dose calculations is 90 dB(A) in the USA, and 85 dB(A) in Europe. Word 7 stores the exchange rate. As described further herein, the exchange rate used to correct working periods greater/less than 8 hours is 5 dB in the USA, and 3 dB in Europe. Word 8 stores the threshold sound level. The threshold sound level is the sound level below which there is zero contribution to noise dose. In the USA, the threshold sound level is 80 dB(A). In Europe, the concept of a threshold sound level is not used, so the threshold sound level is set to 0 dB(A) to ensure that all sounds contribute to the noise dose. Words 9 to 40 store the headset modeling filter. In one example the headset modeling filter is 32 FIR filter coefficients which are values calculated from headset frequency response data.

Figure 6:
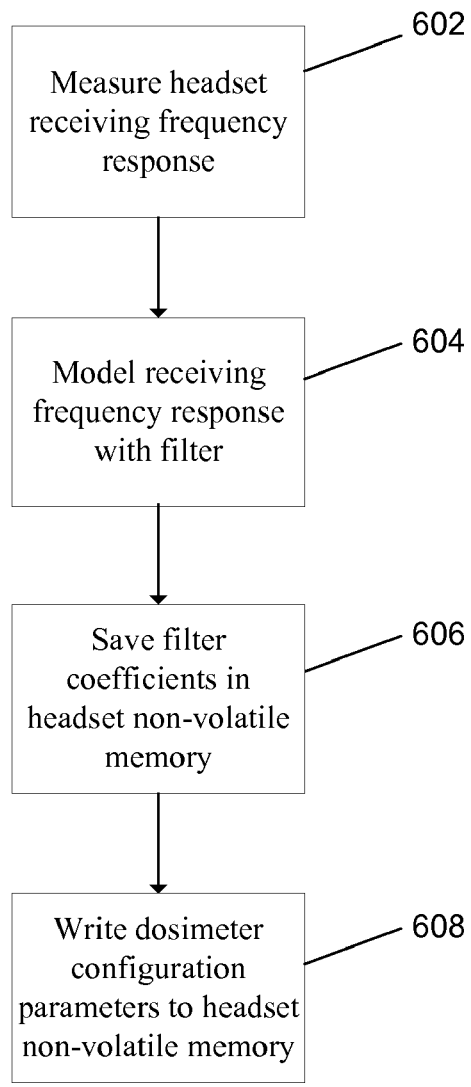
FIG. 6 is a flow diagram illustrating initial calibrating of a wireless headset for measuring noise dose in one example.
Figure 7:
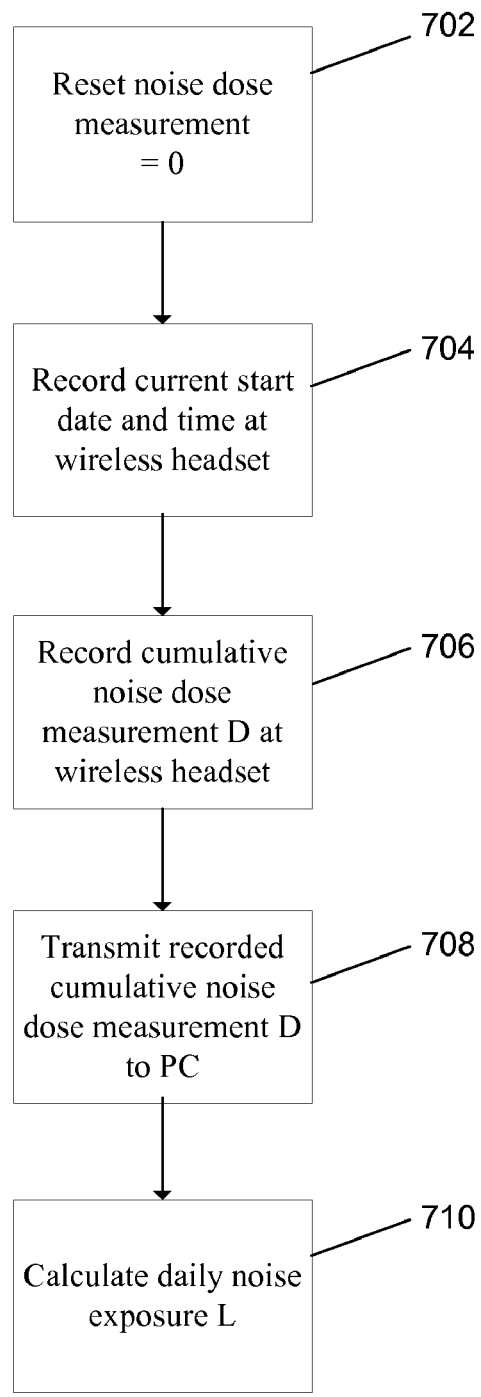
FIG. 7 is a flow diagram illustrating calculating the daily noise dose in a wireless headset.
Figure 8:
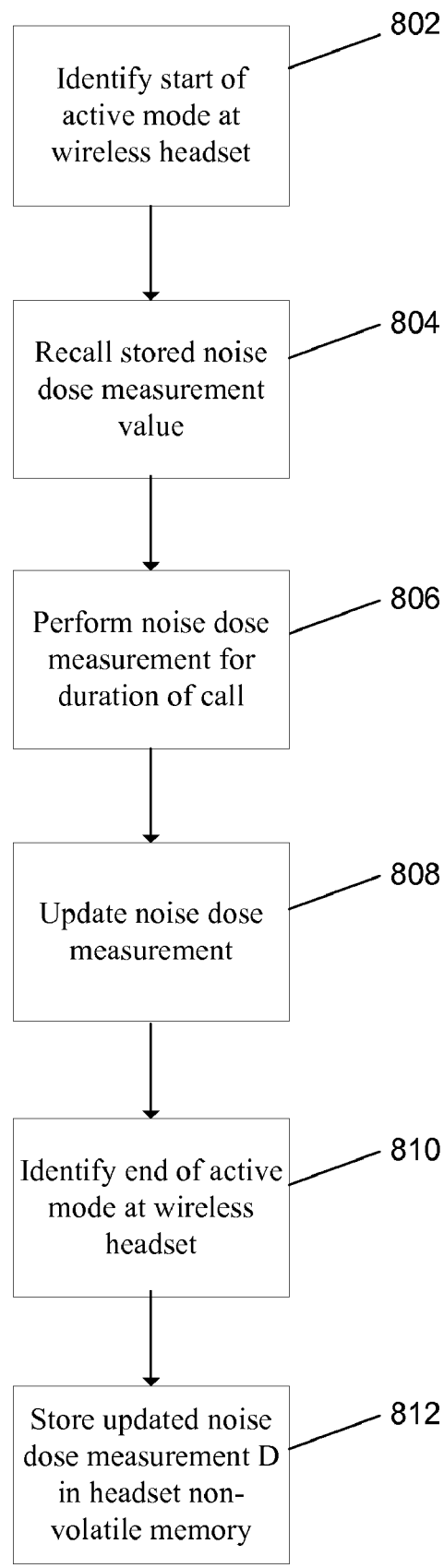
FIG. 8 is a flow diagram illustrating recording the cumulative noise dose at a wireless headset.

FIGS. 6-8 illustrate the process by which the noise dose measurement is made. The process is generally divided into two parts: initial calibration of the wireless headset to make noise dose measurements and actual day-to-day use noise dose measurements. FIG. 6 is a flow diagram illustrating initial calibration of a wireless headset for measuring noise dose in one example. At block 602, the headset's receiving frequency response is measured as described in further detail below. At block 604, the receiving frequency response is modeled with a digital filter. In one example, a 32-tap FIR filter is used. At block 606, the FIR filter coefficients are stored in non-volatile memory, such as in a PS-key that has been allocated for TWA measurement. At block 608, the required dosimeter configuration parameters are saved in the PS-key. The dosimeter configuration parameters include a criterion sound level, an exchange rate, and a threshold sound level as described herein.

For the highest measurement accuracy each headset is individually calibrated by measuring and modeling each individual headset receiving frequency response. For mass production the cost of calibration is avoided, with a slight reduction in measurement accuracy, by programming all headsets of a particular type with the same "generic" FIR filter coefficients. The generic FIR filter coefficients would be derived from frequency response measurements for a statistically significant sample of the headsets.

The process at block 604 whereby the receiving frequency response is modeled with an FIR filter will now be described in further detail. Noise exposure dose calculations, as described below in reference to FIG. 7, are based on A-weighted diffuse-field sound pressure level (SPL) measurements. In non-headset cases, SPL is measured directly using a sound level meter located in the same room as the employees whose daily personal noise exposure is to be measured. However headsets are a special case, because the sound from one user's headset is not heard at the same volume by other people nearby, and cannot be measured by a sound level meter located in the room. Headset sound level measurements rely on measuring SPL at the headset-user's eardrum, using a head and torso simulator (HATS), and then calculating an equivalent diffuse-field SPL. The equivalent diffuse-field SPL is the SPL that a sound level meter would measure if the sound at the headset user's eardrum were produced by an open-field sound instead of by the headset.

Figure 9:
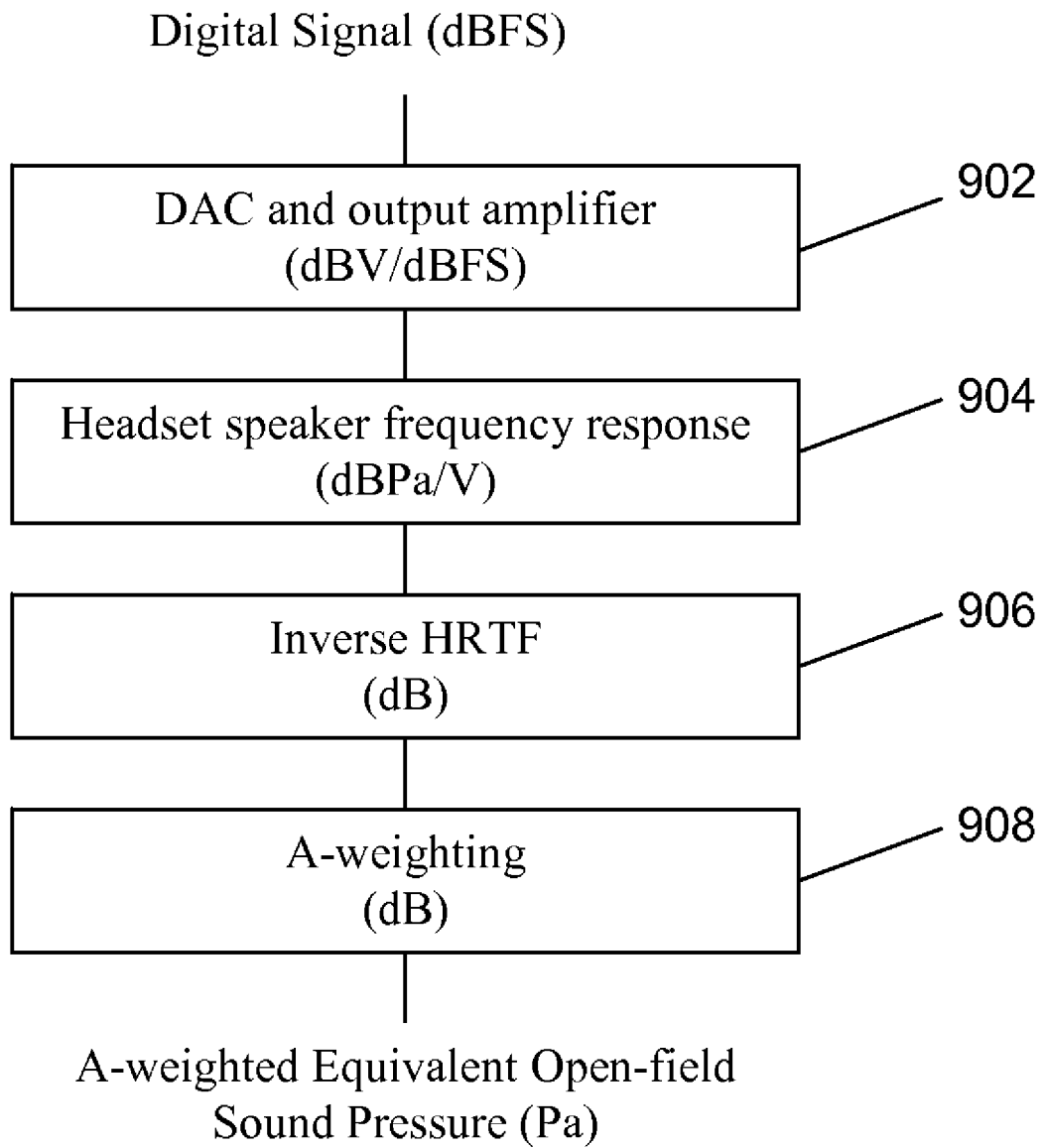
FIG. 9 illustrates a block diagram of a headset's notional receiving-channel electroacoustic signal path that is used to calculate equivalent open-field SPL.

A headset's equivalent diffuse-field SPL depends on the digital signal level driving the headset's speaker (i.e. after all volume controls), and the transfer functions of all the blocks in the electroacoustic signal path between the point at which the digital signal is observed and the notional diffuse-field measurement point. FIG. 9 illustrates a block diagram of a headset's notional receiving-channel electroacoustic signal path that is used to calculate equivalent open-field SPL. Each block is a frequency dependent transfer function. The combined DAC and amplifier transfer function 902 and the headset speaker's frequency response 904 are measured directly. Typically the combined DAC and output amplifier transfer function 902 varies very little from one headset to the next, so it can be considered invariant. The headset speaker's frequency response 904 varies significantly from one headset model to another, and to a lesser degree between different headsets of the same model. The inverse head-related transfer function (HRTF) 906, which transforms sound measurements at the eardrum reference point (DRP) of a head and torso simulator (HATS) into equivalent diffuse-field SPL, and the A-weighting function 908 are standard published data.

The frequency responses of all four blocks are combined into a single composite transfer function. Real-time equivalent diffuse-field SPL measurements are made using a digital system modeling filter that is designed to have a frequency response that exactly matches the physical system's composite transfer function. The digital data from the headset's output buffer are processed by the system modeling filter, which calculates the acoustic pressure waveform at the notional diffuse-field measurement point.

Figure 10:
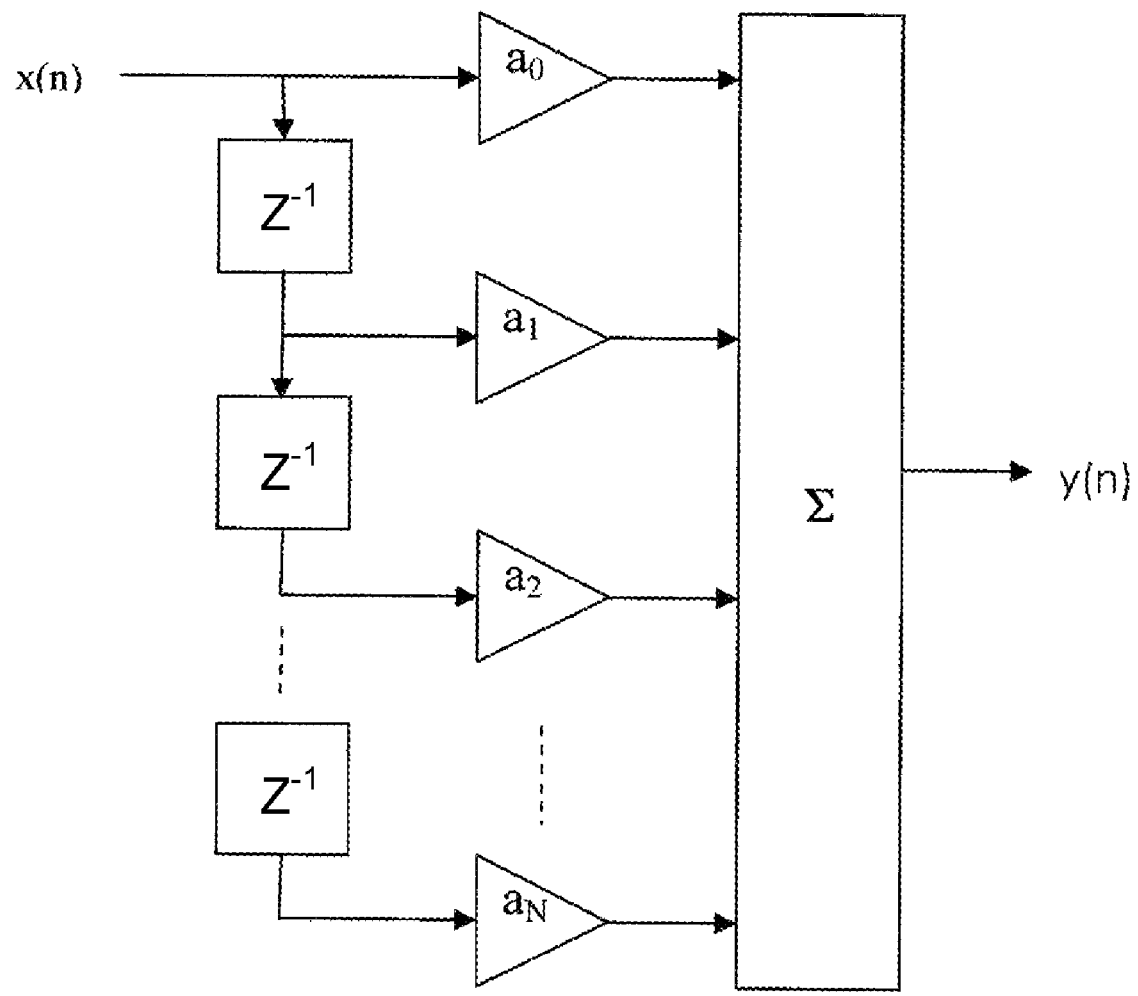
FIG. 10 is a block diagram of a finite impulse response (FIR) filter algorithm

Many different digital filter topologies can be used to implement the system modeling filter, each with particular advantages and disadvantages. One method is to use a finite impulse response (FIR) filter. FIG. 10 is a block diagram of the FIR filter algorithm, which has the transfer function:

$$H(z) = \frac{Y(z)}{X(z)} = \sum_{n=0}^{N-1} a_n z^{-n} \quad (3)$$

Advantages of an FIR filter include being relatively easy to design a filter to match any desired magnitude frequency response, the resulting filter is unconditionally stable, regardless of the transfer function being modeled, and the filtering process does not generate significant noise. In a further example, an infinite impulse response (IIR) filter is used, in which each output sample is a weighted sum of previous input and output samples. An IIR filter can often implement the desired magnitude frequency response with less arithmetic operations than an equivalent FIR filter, but can become unstable because of the feedback of output to input. Designing an IIR filter to meet a target frequency response is generally more demanding than designing an FIR filter, and less amenable to automation. Within the two main classes of digital filter, FIR and IIR, there are many different filter topologies, each with particular properties that may make them more or less suitable for specific applications.

Increasing the order of the FIR system modeling filter (i.e. the number of filter coefficients, N) increases the accuracy with which it models the physical system. However it also increases DSP work load and round-off noise, so the optimum filter length is the one that just achieves the required accuracy. Experience shows that, for a sampling rate of 8 kHz, 32 coefficients are generally sufficient to model a headset system to an accuracy of 1 dB for all signal frequencies in the telephone band (300 Hz to 3.4 kHz). One possible method to design an FIR filter with an arbitrary magnitude frequency response is set forth in section 1 of "Minimum-Phase Signal Processing for Loudspeaker Systems", Malcolm Hawksford, M. O. J., 100 th AES Convention, Copenhagen, May 1996, preprint 4212 (K-1), the contents of which are hereby incorporated by reference.

Figure 11:
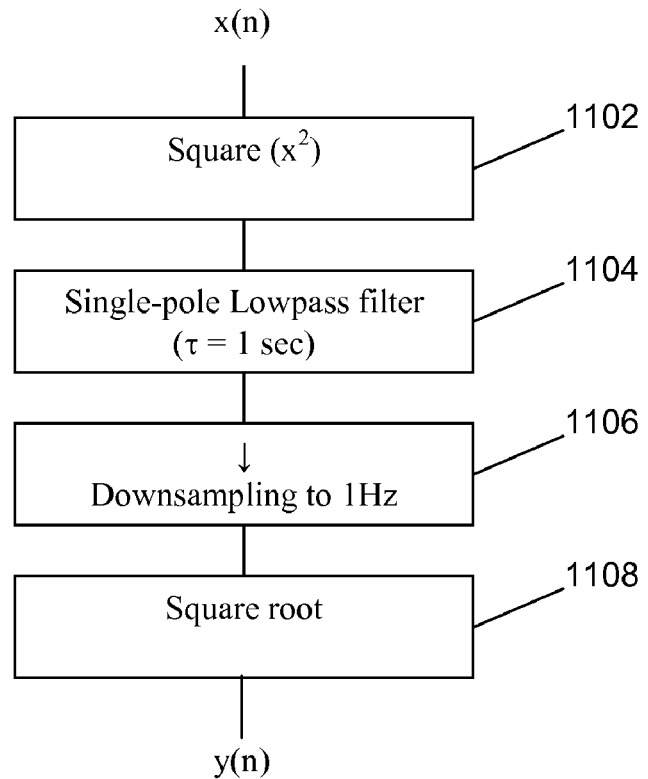
FIG. 11 is a block diagram of an rms level detection process

The sound pressure waveform at the system modeling filter's output is processed by an rms (root mean-square) level detector to determine the equivalent diffuse-field SPL. FIG. 11 is a block diagram of the rms level detection process. At block 1102, the signal is squared. The detector has a one-second time constant, which is implemented using a single-pole IIR lowpass filter at block 1104. This is equivalent to the 'slow' response of standard sound level meter described in ANSI S1.4. At block 1106, the rms detector's output data is downsampled to 1 Hz, to reduce the processing rate for the subsequent noise dose calculations. At block 1108, the square root of the signal is performed.

Figure 12:
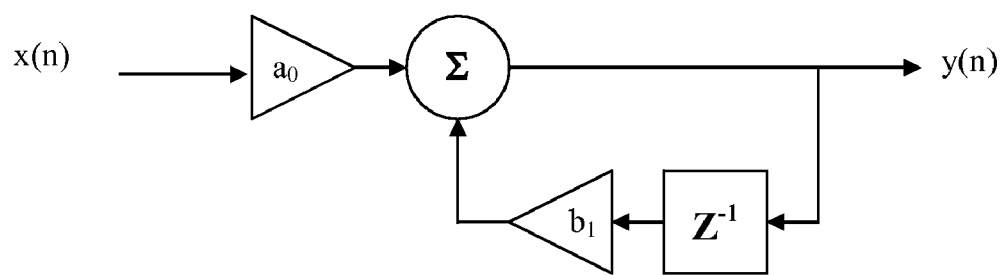
FIG. 12 is a block diagram of an infinite impulse response (IIR) lowpass filter algorithm

FIG. 12 is a block diagram of the IIR lowpass filter algorithm, whose transfer function is:

$$H(z) = \frac{a_0}{1 - b_1 z^{-1}} \quad (4)$$

where:

$$a_0 = 1 - c$$
$$b_1 = c$$
$$c = \exp\left(\frac{-1}{\tau f_s}\right)$$

$\tau$ = filter time constant( = 1 second)

$f_s$ = system sampling frequency(Hz)

FIG. 7 is a flow diagram illustrating calculating the daily noise dose in a wireless headset. This corresponds to the day to day use noise dose measurements. At block 702, the recorded noise dose measurement value at the wireless headset is reset to zero. For example, the value "0" is written to Word number 1 in the TWA noise exposure measurement PS-key. The wireless headset may be connected to a PC that is used to configure and read the noise dose measurements to perform this. At block 704, the start date and time are recorded at the wireless headset and/or the PC for the current measurement period. For example, the start date and time values are written to Words 2-5 of the PS-key. The wireless headset is used as normal throughout the day, and may be switched on and off as often as required.

At block 706, the cumulative noise dose measurement is recorded at the wireless headset. The noise dose measurement is updated during every phone call as described below in reference to FIG. 8. At the end of the day, the wireless headset is connected to the PC that is used to configure and read the noise exposure measurements. At this time, the PC may record an end date and time when the wireless headset is connected to the PC. At block 708, the noise dose measurement (i.e. the value of Word number 1 in the TWA noise exposure measurement PS-key) is transmitted to the PC from the wireless headset, where it may be displayed or stored. In a further example, the value of the noise dose measurement is set to zero following block 708 so that the wireless headset is ready for the next day's use and noise dose measurements.

FIG. 8 is a flow diagram illustrating recording the cumulative noise dose at a wireless headset. For example, the flow diagram may correspond to calculation of the cumulative noise dose for a series of phone calls. At block 802, the start of an active mode at the wireless headset is detected. For example, this may include identifying a first transition from a wireless headset standby mode operation to a wireless headset active mode operation. Where the wireless headset is using the Bluetooth protocol, identifying the transition from a headset standby mode operation to a headset active mode operation is performed by identifying establishment of a Bluetooth audio SCO channel, such as when an incoming call is received. At block 804, a stored noise dose measurement value is recalled. For example, the stored noise dose measurement may be recalled from Word number 1 in the TWA noise exposure measurement PS-key.

At block 806, the noise dose is measured/calculated for the duration of the active mode operation. The noise dose D is calculated as follows:

$$D = \frac{100}{T_0} \int_0^T 10^{[\frac{L-Lc}{E}]\log_{10}|2|} dt \quad (5)$$

$$\text{for } L \geq L_t$$

where:
D=Noise dose (%)
T=total time period of measurement (seconds)
$T_0$=Reference period=28800 seconds (equivalent to 8 hours)
L=A-weighted open-field sound level (dB(A)) (at equivalent diffuse field)
$L_c$=Criterion sound level (dB(A))
$L_t$=Threshold sound level (dB(A))
E =Exchange rate (dB)

This universal noise exposure calculation evaluates daily personal noise exposure compliant with either USA (ANSI S1.25) or International (ISO 1999) measurement standards. The choice depends on the national legislation that applies in the region where a product will be sold: for example, 29 CFR 1910.95 for the United States or DIRECTIVE 2003/10/EC of the European Parliament for the European Union. The universal measurement process is configured differently for the United States and Europe, using the three parameters shown in Table 1. In Europe the Criterion sound level is not defined as it is in the USA. Instead, European noise exposure legislation defines two exposure action values and an exposure limit value. For the purposes of the universal noise exposure calculation described here, the Criterion sound level is equivalent to the upper exposure action value 85 dB(A). This measurement method does not require a real-time clock.

TABLE 1

| Parameter Name | Symbol | Parameter Values (USA) | Parameter Values (Europe) |
| --- | --- | --- | --- |
| Criterion sound level | $L_c$ | 90 dB(A) | 85 dB(A) |
| Exchange rate | E | 5 dB | 3 dB |
| Threshold sound level | $L_t$ | 80 dB(A) | 0 dB(A) |

At block 808, the noise dose measurement value is updated. The value of the noise dose calculated at step 806 is added to the recalled stored noise dose measurement from block 804. In a further example, blocks 806 and 808 are combined so that the noise dose measurement is updated at a regular sampling rate, typically once per second, and equation (5) can be rewritten as:

$$D_n = D_{n-1} + 100 \frac{\Delta T}{T_0} \left[ 10^{[\frac{L-Lc}{E}]\log_{10}|2|} \right] \quad \text{for } L \geq L_t \quad (6)$$

$$D_n = D_{n-1} + 1 \quad \text{for } L < L_t$$

where:

ΔT=time period of noise dose update (seconds)
$D_n$=noise dose measurement at the current sample (sample n)
$D_{n-1}$=noise dose measurement at the previous sample (sample n-1)

This noise dose calculation does not require a real-time clock, requiring only a stable counter to trigger the periodic updates.

If the equipment is used intermittently during the day, the noise dose is stored in non-volatile memory when the equipment switches off and restored at power-up. At block 810, the end of the active mode operation at the wireless headset is identified. For example, this may include identifying a transition from the wireless headset active mode operation to the wireless headset standby mode operation. At block 812, the updated noise dose measurement value is recorded/stored at the wireless headset in non-volatile memory, such as in Word number 1 in the TWA noise exposure measurement PS-key. While in standby mode, power is conserved at the wireless headset.

The noise dose is a percentage value, where 100% corresponds to a daily personal noise exposure equal to the criterion sound level that was set when configuring the dosimeter. It is also permissible in some circumstances to calculate an average noise exposure for a week instead of a single day. In this case, the noise dose PS-key is reset and read once a week, and a noise dose of less than 500% would indicate exposure below the chosen criterion sound level. Comparing the start time PS-key value with the current time (i.e., end date and time when the headset is reconnected to the PC) determines whether the noise dose is for a single day, a week, or some other time period. Noise doses are converted into daily personal noise exposure values using equation (7) or (8) set forth below.

At the end of the day the daily noise exposure $L_{EX,8h}$ is calculated from the cumulative noise dose using equation (7):

$$L_{EX,8h} = \left\{ \frac{E}{\log_{10}|2|} \log_{10} \left| \frac{D}{100} \right| \right\} + L_c \quad (7)$$

The daily noise exposure $L_{EX,8h}$ may be calculated either at the headset and transmitted to the PC as part of block 708 above in FIG. 7, or calculated at the PC from the cumulative noise dose measurement, as shown at block 710.

The noise exposure measurement standards define only daily and weekly personal noise exposure measurements. However a headset user may be interested in evaluating his average daily personal noise exposure for a measurement period other than one day or one week. The following equation (8) is used to calculate average daily personal noise exposure from a measurement interval that spans multiple days.

$$L_{EX,8h} = \left\{ \frac{E}{\log_{10}|2|} \log_{10} \left| \frac{D}{100} \times \frac{T_0}{28800 \, T_M} \right| \right\} + L_c \quad (8)$$

where:
$T_M$=duration of the measurement period (whole number of elapsed days)

In one example, $T_M$ is determined by comparing the end date and time after the measurement period when the headset is connected to the PC with the start date and time corresponding to when the measurement period began (e.g., when the noise dose measurement value was reset to zero).

Automatic limiting of daily personal noise exposure can be implemented within the wireless headset. The gain of an audio signal output at the wireless headset is modified responsive to a long-term rms SPL value exceeding the criterion sound level, or other chosen threshold sound level. One possible approach is to monitor the average dose rate (i.e. cumulative noise dose divided by elapsed time) and automatically reduce the headset volume if the average dose rate exceeds 12.5% per hour, which is the value that gives a 100% dose for a standard 8-hour working day. However if the headset is switched off for part of the working day, and it does not contain a real-time clock, the estimate of elapsed time may be shorter than the actual elapsed time. This would result in an over-estimate of the dose rate, and therefore a larger than necessary volume reduction.

A simpler noise exposure limiting technique, which avoids this problem, is to measure the long-term rms SPL and implement a control loop that automatically reduces the headset volume if the long-term rms SPL exceeds the criterion sound level, or other chosen threshold level. The long-term rms SPL measurement is obtained by feeding the system modelling filter's output into a second rms level detector, which has a longer time-constant than that which is used for the noise dose calculations. In order to achieve a good estimate of the long-term average speech SPL, the time constant should be long relative to typical speech envelope fluctuations (tens of milliseconds) and talking/listening cadence (seconds to tens of seconds). Ideally the time constant should also be long relative to the average phone-call duration and inter-call period (tens of seconds to minutes). However an excessively long time-constant can give rise to measurement errors from slow settling when the headset is switched off and on. In one example, a time constant of several minutes works well.

A control loop may be implemented that automatically reduces the headset volume if the total accumulated noise dose exceeds a preset percentage of an allowable dosage. For instance, if a preset percentage is 85%, and the allowable dosage is set for one week, namely 500%, when a 425% dose is reached the headset volume will be automatically reduced and the user may be warned by an earcon or other form of human interface. This automatic headset volume reduction can also be done in steps, e.g. 85%, 90% and 95% etc. As the percentage dose reaches 85%, 90% and 95%, the earcon or other human interface warning becomes more intense and the reduction becomes steeper. In further examples, (1) automatic sound limiting may be based on the accumulated dose, (2) warnings are generated via the headset's user interface (e.g., earcons, synthesized voice, LED flash, display of the dose on the headset LCD, etc.) based on the accumulated dose, or (3) both user interface warning signals and automatic sound limiting are implemented. In a further example, the headset's user interface includes a means of resetting the accumulated dose to zero without requiring connection to a host PC, thus allowing the headset to become a self-contained noise dosimeter.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for measuring noise dose on a wireless headset comprising:

identifying a first transition from a wireless headset standby mode operation to a wireless headset active mode operation;

recalling a stored noise dose measurement at the wireless headset;

calculating a current noise dose measurement at the wireless headset for a duration of the wireless headset active mode operation;

identifying a second transition from the wireless headset active mode operation to the wireless headset standby mode operation; and recording an updated noise dose measurement at the wireless headset.

2. The method of claim 1, further comprising calibrating the wireless headset to make noise dose measurements.

3. The method of claim 1, further comprising recording a plurality of configuration parameters at the wireless headset.

4. The method of claim 3, wherein the plurality of configuration parameters comprise a criterion sound level, an exchange rate, and a threshold sound level.

5. The method of claim 1, wherein the wireless headset utilizes a Bluetooth wireless communication protocol, and identifying a first transition from a headset standby mode operation to a headset active mode operation comprises identifying establishment of a Bluetooth audio SCO channel.

6. The method of claim 1, further comprising recording a start date and time value and an end date and time value when the wireless headset is connected to a personal computer.

7. The method of claim 1, wherein recording an updated noise dose measurement at the wireless headset comprises storing the updated noise dose measurement in a permanent storage key non-volatile memory.

8. The method of claim 1, further comprising transmitting the stored noise dose measurement from the wireless headset to a personal computer.

9. The method of claim 1, further comprising modifying a gain of an audio signal output at the wireless headset responsive to a long-term rms SPL value exceeding a criterion sound level.

10. A computer readable storage medium storing instructions that when executed by a computer cause the computer to perform a method for measuring noise dose on a wireless headset comprising:

identifying a first transition from a wireless headset standby mode operation to a wireless headset active mode operation;

recalling a stored noise dose measurement at the wireless headset;

calculating a current noise dose measurement at the wireless headset for a duration of the wireless headset active mode operation; and identifying a second transition from the wireless headset active mode operation to the wireless headset standby mode operation; and recording an updated noise dose measurement at the wireless headset.

11. The computer readable storage medium of claim 10, the method further comprising recording a wireless headset frequency response model digital filter coefficients at the wireless headset.

12. The computer readable storage medium of claim 10, the method further comprising recording a plurality of configuration parameters at the wireless headset.

13. The computer readable storage medium of claim 10, wherein the wireless headset utilizes a Bluetooth wireless communications protocol, and identifying a first transition from a headset standby mode operation to a headset active mode operation comprises identifying establishment of a Bluetooth audio SCO channel.

14. The computer readable storage medium of claim 10, the method further comprising recording a start date and time value and a current date and time value.

15. The computer readable storage medium of claim 10, wherein recording an updated noise dose measurement at the wireless headset comprises storing the updated noise dose measurement in a permanent storage key non-volatile memory.

16. The computer readable storage medium of claim 10, the method further comprising transmitting the stored noise dose measurement from the wireless headset to a personal computer.

17. A wireless headset for measuring noise dose comprising:
- a wireless communications transceiver;
- a speaker for outputting an audio signal into a user ear;
- a non-volatile memory storing a filter modeling a frequency response associated with a headset receiving signal path, a criterion sound level, an exchange rate, a threshold sound level, a start time, and a recorded noise dose measurement;
- a processor, wherein the processor calculates a noise dose responsive to establishment and termination of an active wireless communications link by the wireless communications transceiver.

18. The wireless headset of claim 17, wherein the recorded noise dose measurement is an accumulation of calculated noise doses responsive to establishment and termination of a plurality of active wireless communication links.

19. The wireless headset of claim 17, wherein the wireless communications transceiver is a Bluetooth wireless communications transceiver and wherein the active wireless communications link comprises a Bluetooth audio SCO channel.

20. The wireless headset of claim 17, further comprising a noise exposure limiter for modifying a gain of the audio signal responsive to a long-term rms SPL exceeding the criterion sound level.

\* \* \* \* \*